(12) United States Patent
Peterson et al.

(10) Patent No.: US 8,727,369 B2
(45) Date of Patent: May 20, 2014

(54) SLIDING HITCH ASSEMBLY

(71) Applicant: The Coast Distribution System, Inc., Morgan Hill, CA (US)

(72) Inventors: Rodney Peterson, Elkhart, IN (US); Christopher Moore, Elkhart, IN (US); David Hoover, Sturgis, MI (US); Dennis A. Castagnoia, West Linn, OR (US)

(73) Assignee: The Coast Distribution System, Inc., Morgan Hill, CA (US)

( * ) Notice: Subject to any disclaimer, the term of this patent is extended or adjusted under 35 U.S.C. 154(b) by 59 days.

(21) Appl. No.: 13/573,781

(22) Filed: Oct. 3, 2012

(65) Prior Publication Data

US 2013/0099464 A1     Apr. 25, 2013

Related U.S. Application Data

(60) Provisional application No. 61/542,690, filed on Oct. 3, 2011.

(51) Int. Cl.
  *B62D 53/06* (2006.01)
  *B62D 53/08* (2006.01)
(52) U.S. Cl.
  CPC ........ *B62D 53/0814* (2013.01); *B62D 53/0807* (2013.01)
  USPC ......... 280/407; 280/433; 280/438.1; 280/441
(58) Field of Classification Search
  CPC . B62D 53/08; B62D 53/0807; B62D 53/0814
  USPC ................ 280/407, 433, 438.1, 441
  See application file for complete search history.

(56) References Cited

U.S. PATENT DOCUMENTS

| | | | |
|---|---|---|---|
| 2,807,477 A | 9/1957 | Tuso, Jr. | |
| 3,722,914 A * | 3/1973 | Walther | 280/407 |
| 5,344,173 A * | 9/1994 | Beeler et al. | 280/438.1 |
| 5,449,191 A | 9/1995 | Cattau | |
| D380,719 S | 7/1997 | Lindenman et al. | |
| 5,707,070 A | 1/1998 | Lindenman et al. | |

(Continued)

FOREIGN PATENT DOCUMENTS

CA     2576427     8/2007

OTHER PUBLICATIONS

Canadian Intellectual Property Office, Office Action for Application No. 2,791,960, Nov. 20, 2013, 2 pages.

(Continued)

*Primary Examiner* — Kevin Hurley
*Assistant Examiner* — Michael Stabley
(74) *Attorney, Agent, or Firm* — Kolisch Hartwell, PC

(57) ABSTRACT

Sliding hitch assemblies including a rail assembly, a support assembly disposed upon and configured to translate between at least two positions along the rail assembly, a hitch head assembly mounted on the support assembly, and a translation lock mechanism including a locking assembly coupled to the support assembly and configured to selectively lock the support assembly in one or more of the at least two positions on the rail assembly, and an actuating assembly configured to actuate the locking assembly, where the actuating assembly is operably coupled to the locking body by an anti-binding assembly. The support assembly may be disposed upon the rail assembly via a glide block that includes a composite material.

19 Claims, 8 Drawing Sheets

(56) References Cited

U.S. PATENT DOCUMENTS

| | | | |
|---|---|---|---|
| D395,025 S | 6/1998 | Lindenman et al. | |
| 5,772,229 A | 6/1998 | Cattau | |
| 5,839,745 A | 11/1998 | Cattau et al. | |
| 6,247,720 B1 | 6/2001 | Linger et al. | |
| 6,308,977 B1 | 10/2001 | Pulliam et al. | |
| 6,357,777 B1 | 3/2002 | Linger et al. | |
| 6,386,570 B2 | 5/2002 | Linger et al. | |
| 6,488,305 B2 * | 12/2002 | Laarman | 280/438.1 |
| 6,557,883 B2 | 5/2003 | Linger et al. | |
| 6,682,089 B2 | 1/2004 | McCoy et al. | |
| 6,685,210 B2 | 2/2004 | Lindenman et al. | |
| 6,736,420 B2 * | 5/2004 | Laarman et al. | 280/438.1 |
| 7,108,274 B2 * | 9/2006 | Laarman | 280/438.1 |
| 7,114,740 B1 | 10/2006 | Mann et al. | |
| 7,240,913 B2 | 7/2007 | Kahrs et al. | |
| 7,296,817 B1 | 11/2007 | Mann et al. | |
| 7,490,846 B2 | 2/2009 | Kaun | |
| 7,506,886 B2 | 3/2009 | Warnock | |
| 7,530,589 B1 | 5/2009 | Mann et al. | |
| 7,584,982 B2 | 9/2009 | Fisher | |
| 7,699,334 B1 | 4/2010 | Mann et al. | |
| 7,717,451 B2 * | 5/2010 | Alguera | 280/438.1 |
| 7,753,392 B2 | 7/2010 | Warnock | |
| 8,220,818 B1 | 7/2012 | Pulliam et al. | |
| 8,511,703 B2 * | 8/2013 | Peterson et al. | 280/438.1 |
| 2006/0202443 A1 * | 9/2006 | Sibley et al. | 280/441 |
| 2011/0109061 A1 | 5/2011 | Peterson et al. | |
| 2012/0280472 A1 * | 11/2012 | Appel | 280/441 |

OTHER PUBLICATIONS

Smart & Biggar, Response to Office Action for Application No. 2,791,960, Feb. 17, 2014, 16 pages.

\* cited by examiner

SLIDING HITCH ASSEMBLY

CROSS-REFERENCE TO RELATED APPLICATIONS

This nonprovisional patent application claims benefit under 35 U.S.C. 119(e) of provisional patent application Ser. No. 61/542,690, filed Oct. 3, 2011, for SLIDING HITCH ASSEMBLY, which is hereby incorporated by reference in its entirety.

FIELD OF THE DISCLOSURE

The present disclosure relates generally to towing hitch assemblies and, more particularly, to hitch assemblies having a hitch that is longitudinally movable relative to the towing vehicle.

BACKGROUND OF THE DISCLOSURE

A popular type of towing hitch assembly is a fifth wheel hitch assembly. This type of towing hitch assembly utilizes a horseshoe-shaped coupling device, or fifth wheel, on the rear of the towing vehicle to secure a coupling pin (or kingpin) disposed at the front of the load to be towed. In order to secure the towed load, the coupling pin is inserted into the fifth wheel, which is then rotated, thereby locking the coupling pin securely in place for towing.

Where the fifth wheel hitch assembly is capable of longitudinal translation relative to the towing vehicle, the hitch assembly is a sliding hitch assembly. The longitudinal movement of the fifth wheel assembly allows the fifth wheel, and correspondingly the coupling pin secured by the fifth wheel, to be selectively positioned relative to the towing vehicle. For example, the fifth wheel may be located substantially above the towing vehicle's rear axle during normal towing, and then selectively displaced in the direction of the rear end of the towing vehicle in order to permit increased clearance between the towing vehicle and trailer. This increased clearance in turn offers greater maneuverability, as the towing vehicle and trailer may perform tighter turns due to the increased clearance.

Selected examples of towing hitch assemblies are disclosed in U.S. Pat. No. 5,707,070, U.S. Pat. No. 5,772,229, U.S. Pat. No. 6,386,570, U.S. Pat. No. 6,557,883, U.S. Pat. No. 6,682,089, U.S. Pat. No. 6,685,210 and U.S. Pat. No. 7,584,982 and U.S. Patent Publication No. US20110109061. The disclosures of these and all other publications referenced herein are incorporated by reference in their entirety for all purposes.

SUMMARY

The present disclosure is directed to sliding hitch assemblies that include a rail assembly, a support assembly disposed on the rail assembly and configured to translate between at least two positions along the rail assembly, a hitch head assembly mounted on the support assembly, and a translation lock mechanism including a locking assembly coupled to the support assembly and configured to selectively lock the support assembly in one or more of the at least two positions on the rail assembly, and an actuating assembly configured to actuate the locking assembly, where the actuating assembly is operably coupled to the locking body by an anti-binding assembly.

The present disclosure is additionally directed to sliding hitch assemblies that include a rail assembly having an upper sliding surface, and a support assembly disposed on the upper sliding surface via a glide block that includes a composite material, and where the support assembly is configured to translate between at least two positions along the rail assembly on the composite glide block. The sliding hitch assemblies further include a hitch head assembly mounted on the support assembly, and a translation lock mechanism that includes a locking assembly coupled to the support assembly and configured to selectively lock the support assembly in one or more of the at least two positions on the rail assembly. The sliding hitch assemblies further include an actuating assembly configured to actuate the locking assembly, where the actuating assembly is operably coupled to the locking assembly.

The present disclosure is yet additionally directed to sliding hitch assemblies that include a rail assembly that includes a slide rail and a pivot stop, where the slide rail includes an upper sliding surface and the pivot stop is disposed adjacent to the slide rail. The sliding hitch assemblies also include a support assembly, where the support assembly is disposed upon the upper surface of the slide rail via a composite glide block, so that the support assembly is configured to translate along the slide rail between a first and a second position. The sliding hitch assemblies further include a hitch head assembly pivotally mounted on the support assembly, and a locking assembly coupled to the support assembly and including a pivot plate pivotally attached to the support assembly where the pivot plate has a first end and a second end, and the pivot plate first end is configured to engage the pivot stop to retain the support assembly in the first position when the pivot plate is in a first orientation, and the pivot plate second end is configured to engage the pivot stop to retain the support assembly in the second position when the pivot plate is in a second orientation. The sliding hitch assemblies further include an actuating assembly coupled to the pivot plate via an anti-binding assembly, and the actuating assembly is configured to reversibly pivot the pivot plate between the first and second orientations through the application of an appropriate bias to the pivot plate, where the anti-binding assembly is configured to apply the appropriate bias to the pivot plate when it is bound or prevented from pivoting, and the applied bias is sufficient to subsequently pivot the pivot plate when it is subsequently not bound or free to pivot.

DETAILED DESCRIPTION OF PREFERRED EMBODIMENTS

Figure 1:
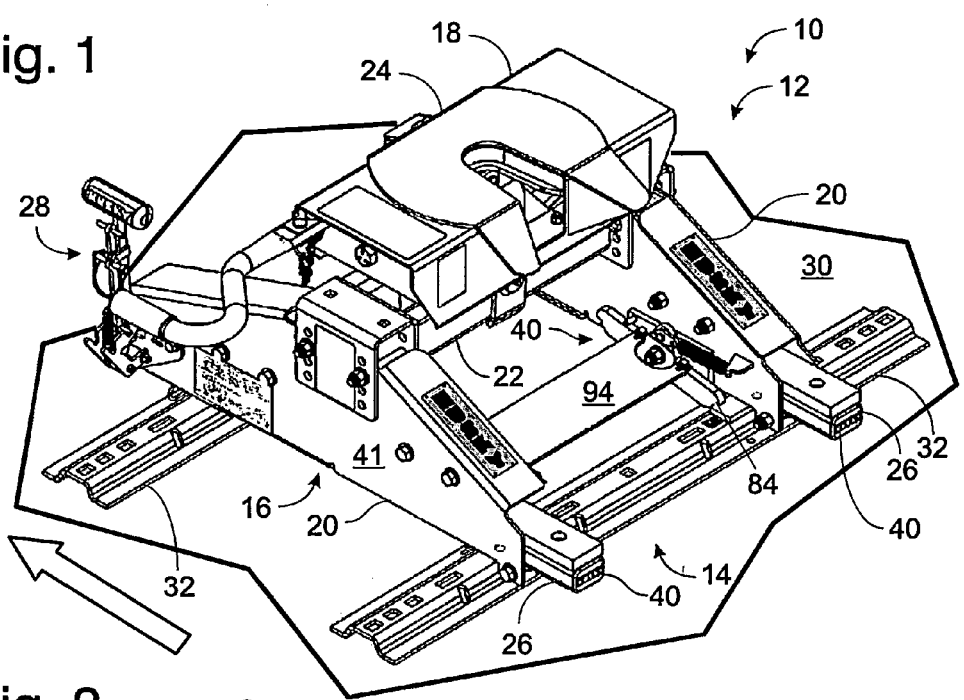
FIG. 1 is a perspective view of an exemplary embodiment of a sliding hitch assembly according to the present invention, with the hitch carriage in the first or towing position, where the arrow indicates the direction of the towing vehicle.
Figure 2:
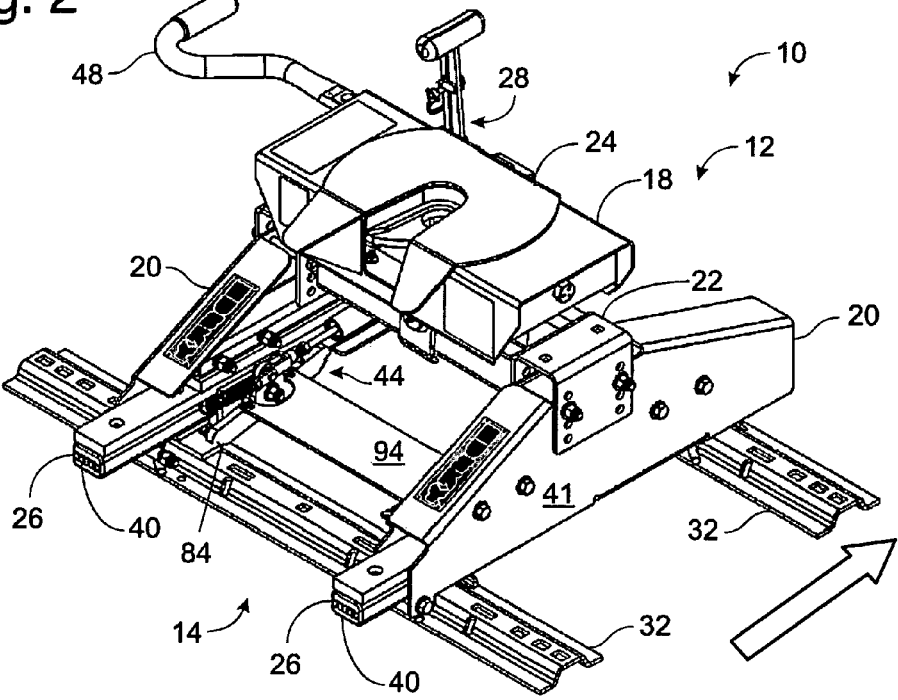
FIG. 2 is an alternative perspective view of the sliding hitch assembly of FIG. 1, where the arrow indicates the direction of the towing vehicle

With reference to FIGS. 1 and 2, a nonexclusive illustrative example of a sliding hitch assembly of the present invention is shown generally at 10. Unless otherwise specified, sliding hitch assembly 10 may contain, but is not required to contain, at least one of the structures, components, functionalities, concepts, and/or variations described, illustrated, and/or incorporated herein.

As illustrated by FIGS. 1 and 2, sliding hitch assembly 10 may include a hitch carriage 12, and a rail assembly 14, where the hitch carriage 12 is typically configured so that it may be translated, or moved, upon the rail assembly 14 between at least two positions: a driving position, and a maneuvering position.

Hitch carriage 12 may include a support assembly 16 that is disposed upon and is configured to translate along the rail assembly 14, and a hitch head assembly 18 that may be pivotably mounted on the support assembly 16. The support assembly 16 may include a support housing 20 and a cross member 22, where the support housing 20 may be translationally mounted upon the rail assembly 14, and the cross member 22 may be coupled to the support housing 20 and configured to support a hitch head assembly 18. Hitch head assembly 18, in turn, may include a fifth wheel hitch 24.

Figure 3A:
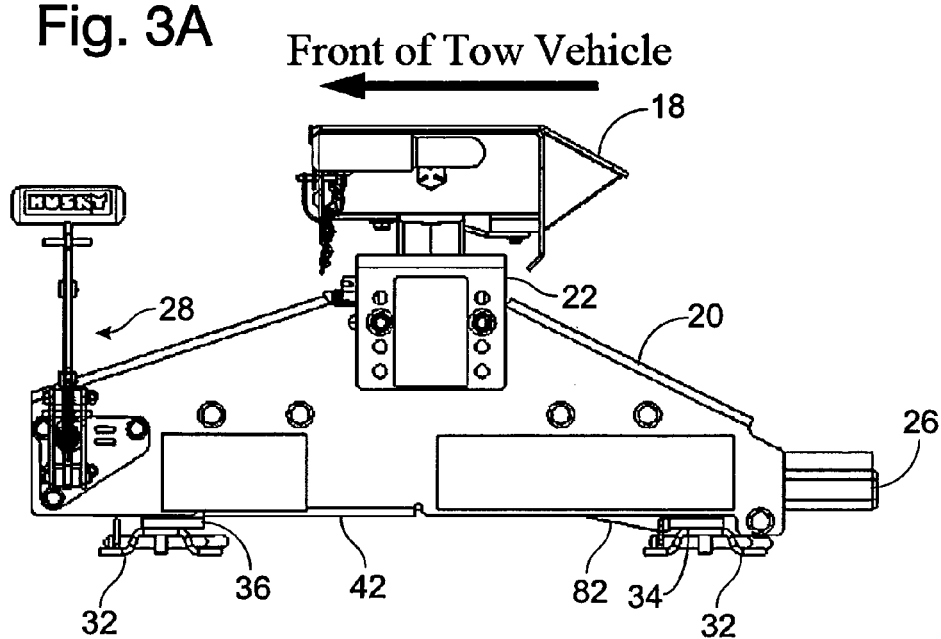
FIG. 3A is a right side elevation view of the sliding hitch assembly of FIG. 1 in a first or towing position.
Figure 3B:
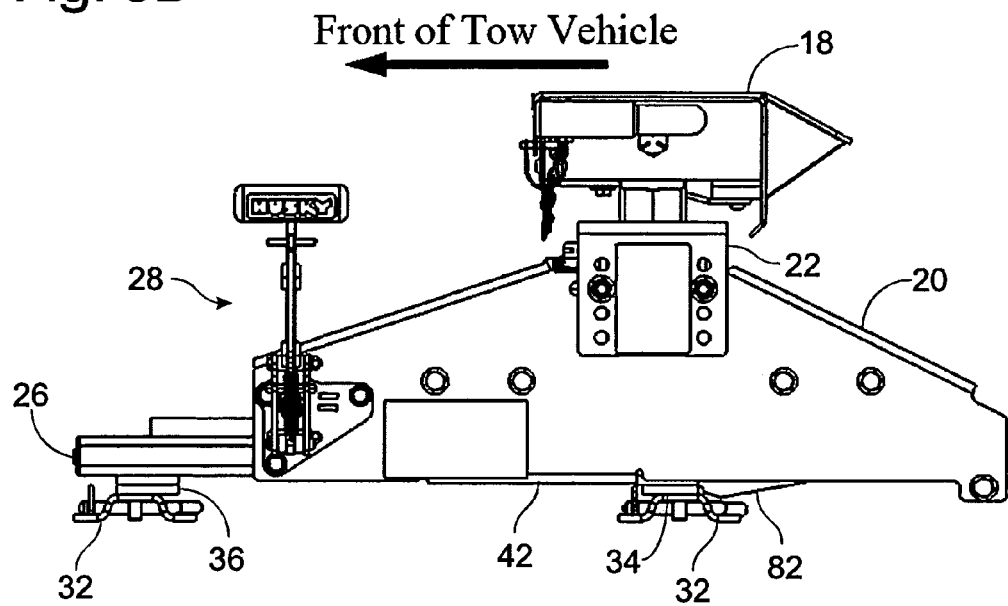
FIG. 3B is a right side elevation view of the sliding hitch assembly of FIG. 1 in a second or maneuvering position.

The sliding hitch assembly may also include an actuating assembly 28 configured to selectively lock the hitch carriage 12 in one or more of the at least two positions along the rail assembly 14. Typically, locking the hitch carriage in the first position will secure the fifth wheel hitch 24 in a position disposed substantially above the towing vehicle's rear axle (as shown in FIG. 3A), for improved towing operation, while locking the hitch carriage 12 in the second position secures the fifth wheel hitch 24 in a position displaced toward the rear of the towing vehicle, relative to the first position (as shown in FIG. 3B, thereby increasing the clearance between the towing vehicle and the towed load and providing increased maneuverability. In one embodiment, the second position corresponds to a displacement of the fifth wheel hitch 24 approximately 10 inches rearward from the towing vehicle's rear axle.

Rail Assembly

The rail assembly 14 may include one or more slide rails 26, that may be secured to an appropriate mounting surface 30 of a towing vehicle, such as the floor of a truck bed, for example. The slide rails 26 may be secured directly to the mounting surface 30, or they may be secured via one or more base rails 32 which are themselves secured to mounting surface 30.

The rail assembly 14 may provide a means of mounting hitch carriage 12, and additionally may permit the hitch carriage to translate along the one or more slide rails 26 of the rail assembly 14, by sliding, rolling, or otherwise moving along the side rails. Rail assembly 14 may further include one or more plate stops that may extend beneath slide rail 26, such as aft plate stop 34 and forward plate stop 36, as shown in the rail assembly of FIG. 3 from a perspective beneath the rail assembly, where the towing vehicle is to the left of the figure. Plate stops 34 and 36 may be configured to limit the translation of the hitch carriage along slide rails 26.

As shown in FIGS. 1 and 2 and discussed in further detail below, the hitch carriage 12 may rest on, or be supported by and/or over, the upper surface 38 of slide rail 26. When the hitch carriage 12 moves between the first position and the second position, the hitch carriage 12 may roll, slide or otherwise move along upper face 38 of the slide rail 26, within the travel limits defined by plate stops 34 and 36.

In some embodiments, slide rails 26 may include one or more end caps 40, as shown in FIGS. 1 and 2. These end caps, when present, may be fabricated using any suitable material, including plastics or rubber. The end cap may be manufactured using any suitable method, including injection molding, and may help prevent injuries, protect the end surfaces of the slide rails, and provide an opportunity for branding by displaying the name or trademark of the manufacturer of the sliding hitch assembly. Typically, the end cap includes a rubber material.

Hitch Carriage

The hitch carriage 12 may rest on, or be supported by and/or over, slide rail 26 of rail assembly 14. When the hitch carriage 12 moves between the defined first position and the defined second position, the hitch carriage 12 may roll, slide or otherwise translate along an upper surface 38 slide rail 26.

The hitch carriage 12 typically travels along slide rails 26 via support assembly 14 where the support assembly provides a secure platform or mount for the hitch head assembly 18. The support assembly may include one or more support housings 20 and a cross member 22 that may be secured to the support housings 20 by one or more securing means, and may itself in turn include means for supporting and pivotably securing hitch head assembly 18.

The support assembly 14 may typically include one or more support housings 20 that are disposed upon slide rails 26. Generally, the sliding hitch assembly 10 includes one support housing for each slide rail 26 incorporated in the rail assembly 14, and the present discussion will be in reference to an exemplary embodiment of a sliding hitch assembly that includes two such support housings, as illustrated in FIGS. 1 and 2. It should be understood, however, that numerous variations of the disclosed support assembly or assemblies may be envisioned by a skilled artisan, such as for example a support assembly having a single support housing that extends across and is disposed upon two or more slide rails, or the addition of a jack screw, rod, or tube between adjacent support housings in order to ensure that adjacent support housings 20 maintain an appropriate alignment with the rail assembly 14.

Each support housing 20 may be disposed upon and at least partially enclose slide rail 26. Typically, side walls 41 of support housing 20 may extend below the level of the upper surface of slide rail 26 so that the side walls bracket the slide rail. Additionally, support housing 20 may include a travel plate 42 extending horizontally from one or between both side walls 41 of the support housing 20 and beneath slide rail 26.

Figure 4A:
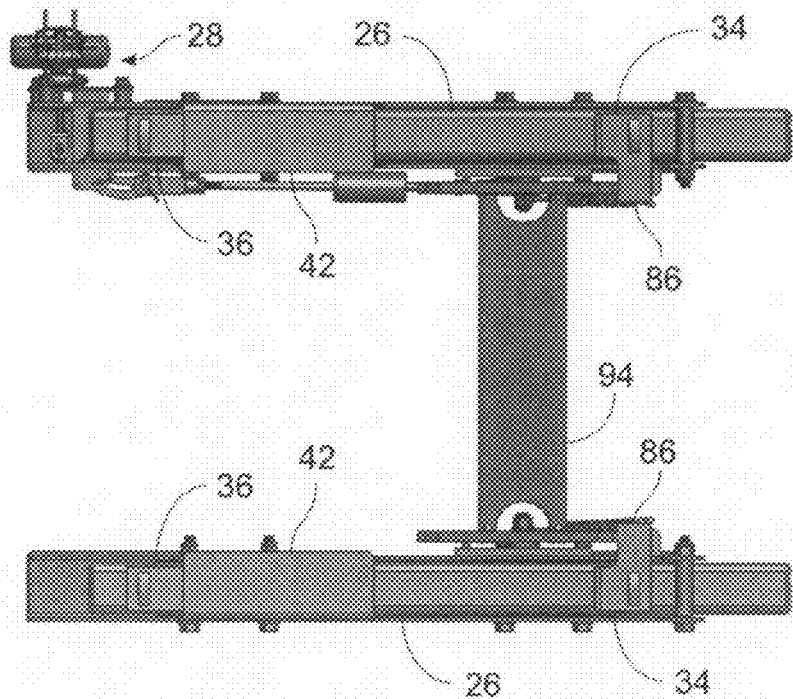
FIG. 4A is a bottom plan view of the support housing and slide rails of the sliding hitch assembly of FIG. 1, with the support housing in the first or towing position.
Figure 4B:
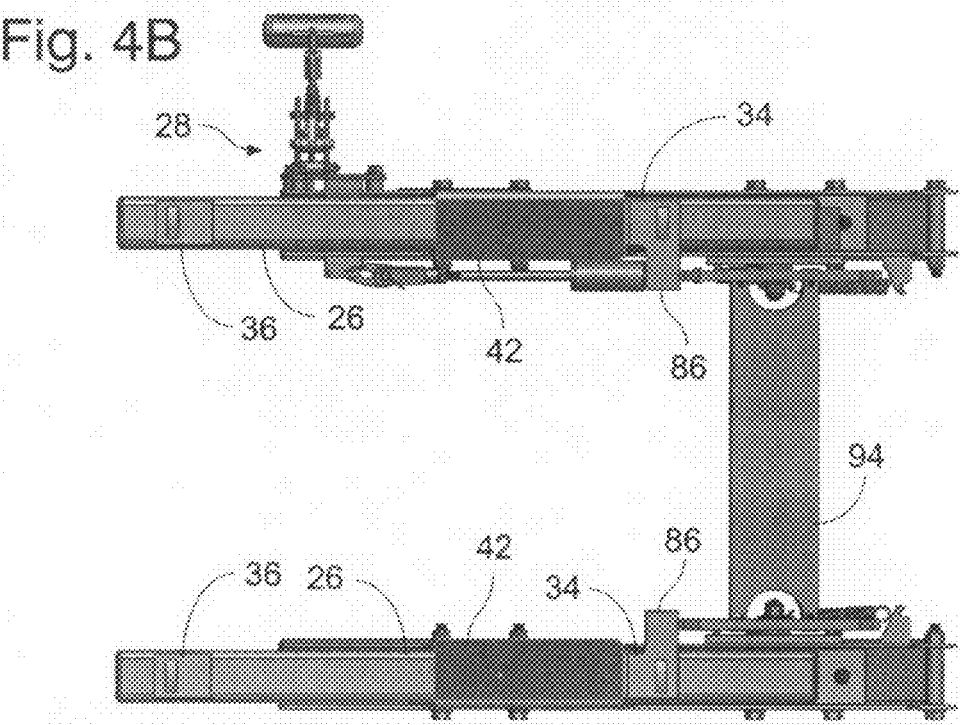
FIG. 4B is a bottom plan view of the support housing and slide rails of the sliding hitch assembly of FIG. 1, with the support housing in the second or maneuvering position.
Figure 5:
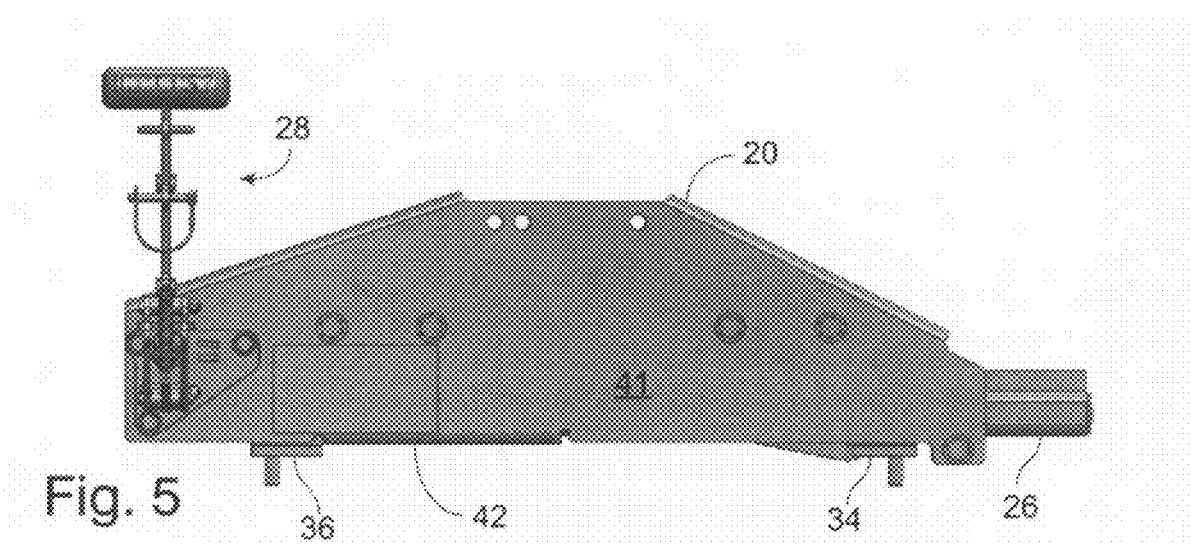
FIG. 5 is a right side elevation view of the support housing and slide rails of the sliding hitch assembly of FIG. 1, with the support housing in the first or towing position.

Travel plate 42 may be configured to interact with plate stops 34 and 36 to at least in part determine the first position and second position for the hitch carriage 12 along the rail assembly 14. FIGS. 4A and 4B show the rail assembly 14 and support housing 20 from a perspective beneath the rail assembly, with the front of the towing vehicle to the left. In FIG. 4A the support housing 20 and therefore travel plate 42 are in the position correspond to the first position of hitch carriage 12. In this first position, or towing position, the hitch carriage is in the most forward position permitted along slide rail 26, with travel plate 42 in contact with forward plate stop 36. When the support housing 20 is in this position, towing force cannot be directly transferred to travel plate 42, and is instead transferred to the support housing via pivot stop 86 and locking assembly 44, as will be discussed in greater detail below. FIG. 5 also shows support housing 20 and slide rails 26 where the support housing is in the first or towing position, as viewed from the side, with the front of the towing vehicle to the left.

In FIG. 4B, the support housing 20 and therefore travel plate 42 are in the position corresponding to the second position of hitch carriage 12. In this second position, or maneuvering position, the hitch carriage is in the most rearward, or aft position permitted along slide rail 26, as travel plate 42 is in physical contact with aft plate stop 34. When the support housing 20 is this second position, the towing forces applied by the tow vehicle are transferred to the hitch carriage at least substantially via the contact between aft plate stop 34 and travel plate 42.

Support housing or housings 20 provide a foundation and support for cross member 22, which may be secured to each support housing by one or more securing means such as, for example, bolts, rivets, screws, welds, and the like. Typically, the cross member 22 is secured to the support housing 20 by one or more bolts. Cross member 22 may provide a foundation and support for mounting the hitch head assembly 18, which may be pivotably mounted upon cross member 22. One or more of the cross member 22 and the hitch head assembly 18 may incorporate means for adjusting the height of the fifth wheel hitch 24 with respect to the height of the mounting surface 30.

Hitch head assembly 18 may include a fifth wheel hitch 24, including a hitch plate 46 that defines an opening configured to receive a kingpin for a trailer or towed vehicle (not shown) which may be engaged by fifth wheel hitch 24 in a conventional manner. Hitch head assembly 18 may further include a handle 48 to facilitate the rotation or pivoting of the hitch head assembly once the fifth wheel hitch receives the kingpin in order to secure the towed load. Hitch head assembly 18 may further include a lock member which may be used to prevent the hitch head assembly from rotating once engaged with a kingpin (not shown).

Figure 6:
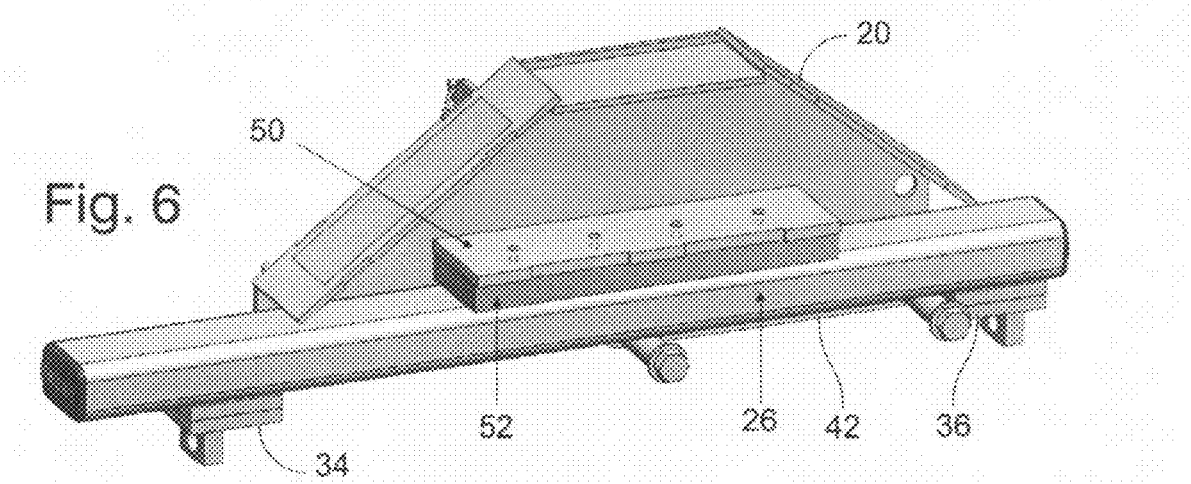
FIG. 6 is a perspective sectional view of a support housing and slide rail of the sliding hitch assembly of FIG. 1.

Support housing 20 may be supported on upper surface 38 of slide rail 26 via an internal upper rail 50, which may additionally or alternatively be referred to as a secondary tube or plate, as shown in FIG. 6. The sliding hitch assembly 10 may alternatively employ one or more glide or wear blocks at the contact points between upper rail 50 and slide rail 26. One or both of the upper surface 38 and/or the upper rail 50 may include such a glide blocks. For example as shown in FIG. 6, upper rail 50 may further include an upper glide block 52 attached to the lower surface of upper rail 50, so that when support housing 20 is disposed upon slide rail 26, the surface of glide block 52 contacts the upper surface 38 of the slide rail, so that the support housing, and therefore the entire hitch carriage, is resting upon the slide rail via glide block 52. Therefore, when hitch carriage 12 translates along slide rail 26, the sliding contact may be between glide block 52 of the support housing and upper surface 38 of slide rail 26.

Figure 7:
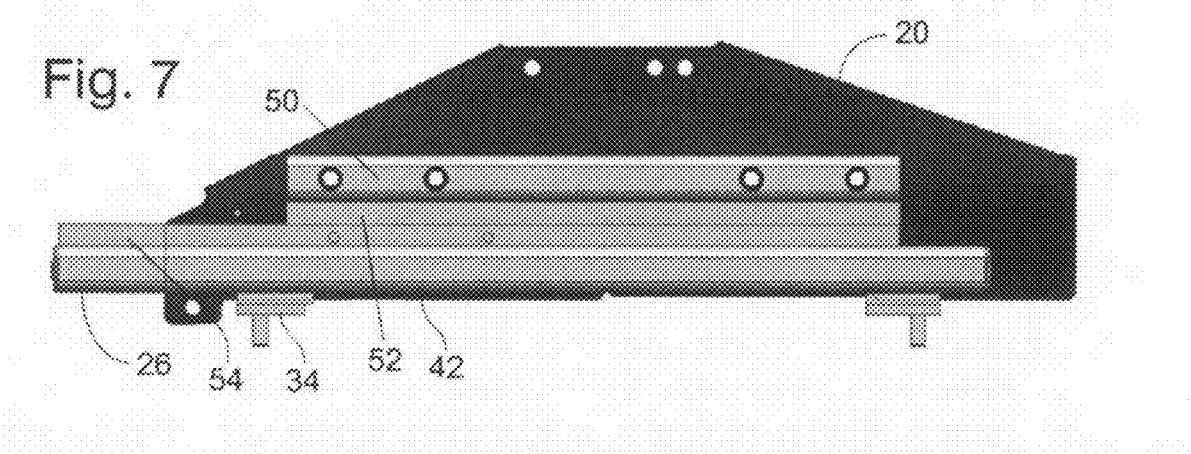
FIG. 7 is a left side elevation section view of a support housing and slide rail of a sliding hitch assembly according to an alternative embodiment of the invention.

Typically glide block 52 of support housing 20 rests upon and translates along the upper surface 35 of slide rail 26. Alternatively or in addition, the upper surface 38 of slide rail 26 may include a lower glide block 54. In this embodiment, as hitch carriage 12 translates along slide rail 26, glide blocks 52 and 54 act as the interface between support assembly 16 and slide rail 26, and the sliding contact is between glide block 52 and glide block 54. As shown in FIG. 7, glide block 54 may extend to an end of slide rail 26.

It should be appreciated that applied trailer tongue loads, as well as the weight of the hitch carriage itself, may impose significant loads on glide blocks 52 and sliding surface 38 (or glide block 54 if present). Such loads may cause high friction between, and therefore potential wear to, the glide blocks and/or the sliding surfaces. To reduce such friction and/or the noise of moving the hitch carriage along the rails, the glide blocks may be fabricated from a material having a relatively low or reduced coefficient of friction, and/or a high degree of wear resistance. Many polymer formulations exist that have advantageous combinations of these properties. In some embodiments of the sliding hitch assembly, one or more slide blocks may include one or a combination of ultra-high-molecular-weight (UHMW) polymers. Particularly suitable polymers may include ultra-high-molecular-weight polyethylene (UHMWPE), nylon and/or nylon 66. While the upper surface 38 of slide rail 26 may incorporate such a glide block, typically the upper surface includes a relatively harder material, such as metal, helping reduce both cost and frequent maintenance due to wear.

Translation Lock Mechanism

Figure 8:
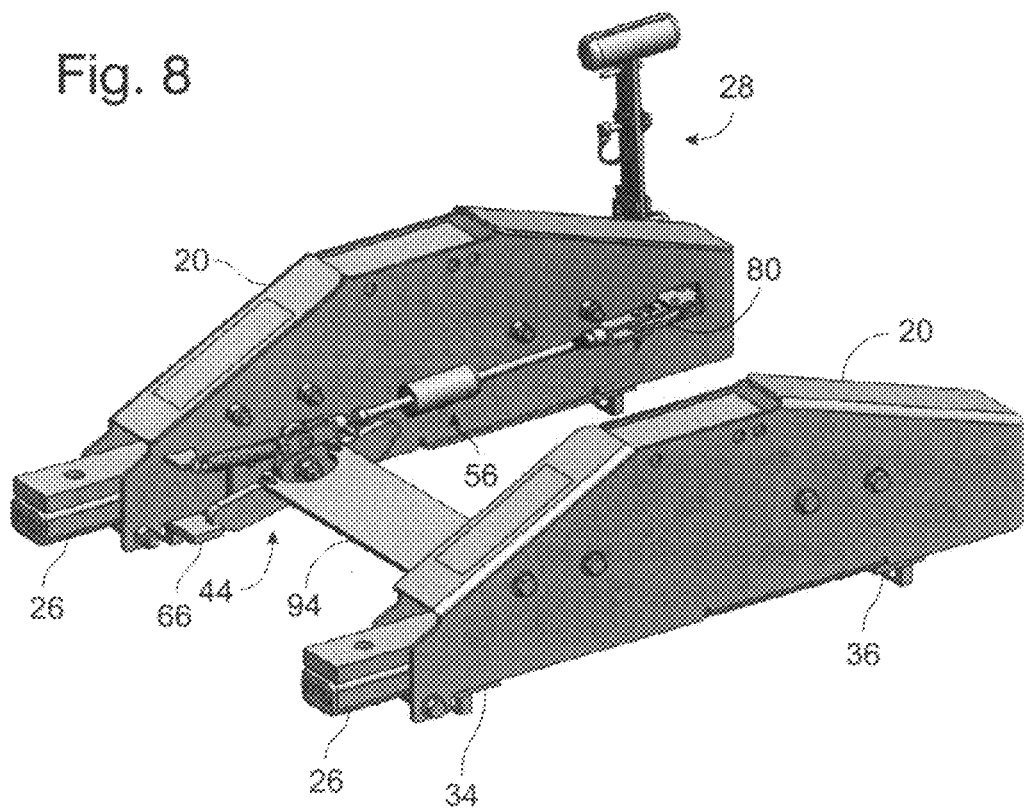
FIG. 8. is a left perspective view showing the relationship between the support housings, slide rails, actuating assembly, locking assembly, and anti-binding assembly of the sliding hitch assembly of FIG. 1.

As shown in FIG. 8 (where the front of the towing vehicle is to the right of the figure), the sliding hitch assembly 10 may employ a translation lock mechanism to impede or prevent forward movement of the hitch carriage 12 and its associated fifth wheel hitch 24 beyond the first position, and/or rearward movement of the hitch carriage 12 and fifth wheel hitch 24 beyond the second position. The translation lock mechanism may include an actuating assembly 28 and a locking assembly 44, where the actuating assembly 28 is operatively coupled to the locking assembly 44 by an anti-binding assembly 56.

Figure 9:
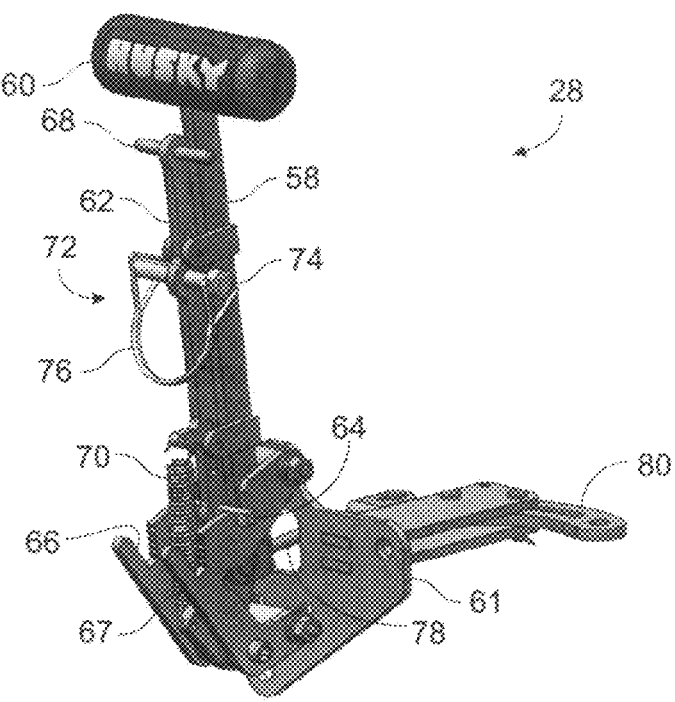
FIG. 9 is a perspective view of the actuating assembly of the sliding hitch assembly of FIG. 1.
Figure 10:
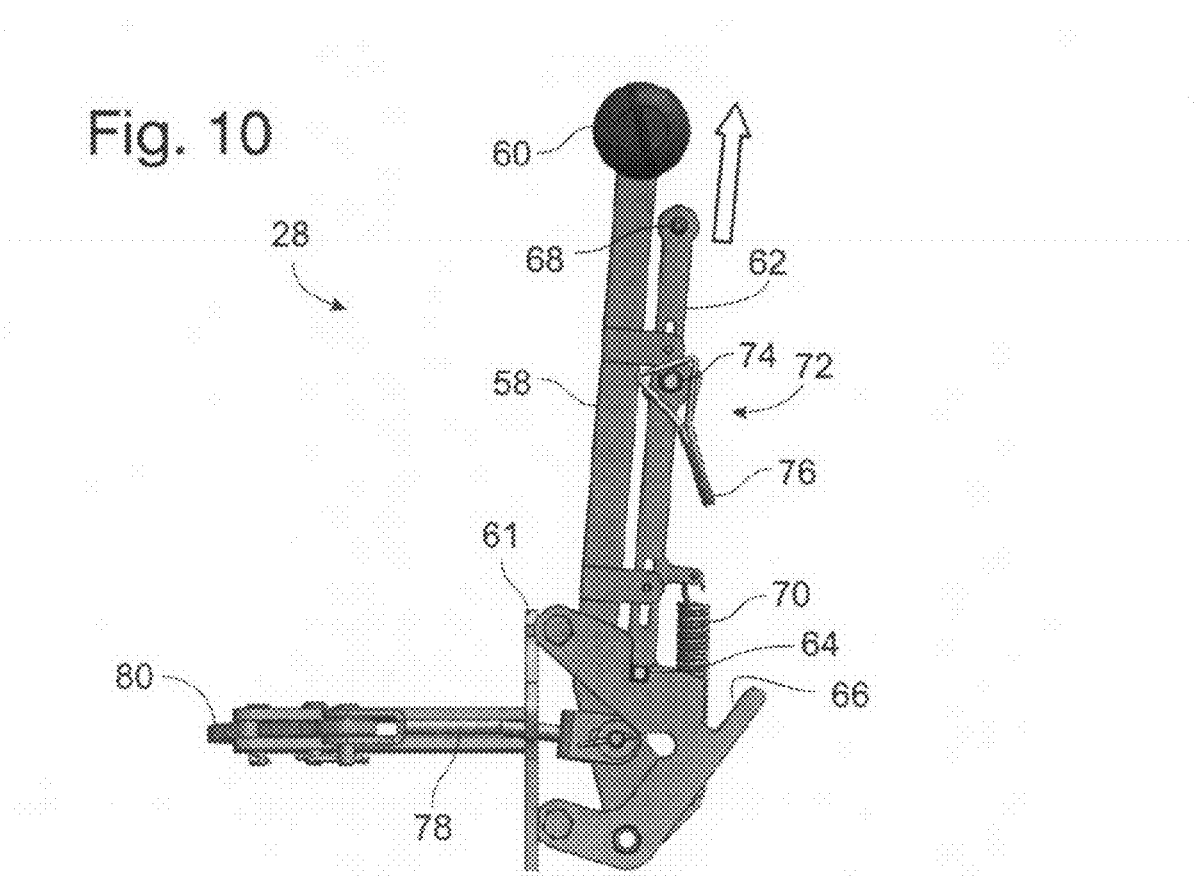
FIG. 10 is a side elevation of the actuating assembly of FIG. 8 in an appropriate position for locking the sliding hitch assembly of FIG. 1 in a towing configuration.
Figure 11:
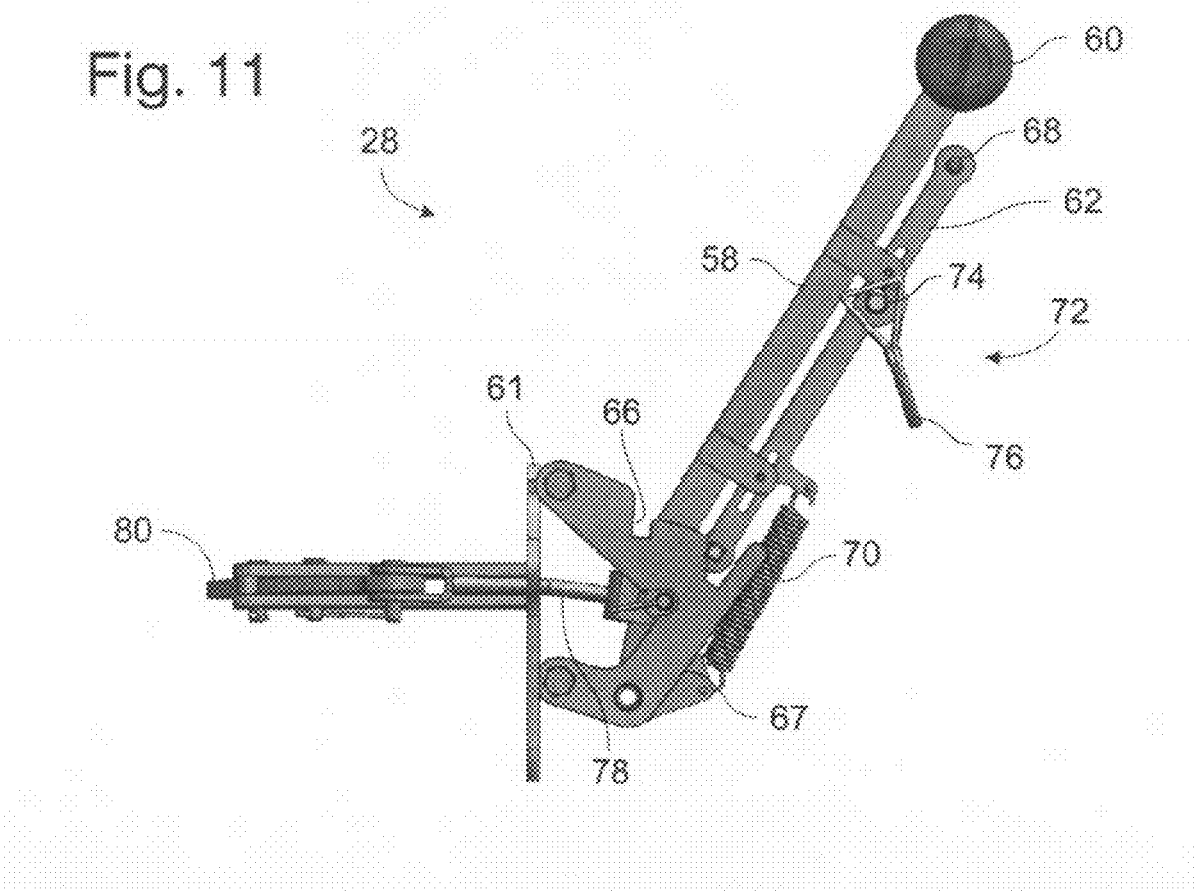
FIG. 11 is a side elevation of the actuating assembly of FIG. 8 in an appropriate position for locking the sliding hitch assembly of FIG. 1 in a maneuvering configuration.

As depicted in FIGS. 9-11, actuating assembly 28 may include a position-selecting lever 58, including a pull handle 60, typically disposed on or proximate to one of the slide rails 26. Position-selecting lever 58 may include a pull handle 60. Pull handle 60 may include a means for enhancing the manual operation of the locking mechanism, such as a handgrip, or more particularly a molded rubber handgrip. The position-selecting lever 58 may be disposed on or proximate one of the slide rails 26. In one embodiment, the position-selecting lever 58 is disposed on a support housing 20, proximate a forward end of the driver-side slide rail 26, as shown in FIGS. 1-5 and 8. The position-selecting lever 58 may be mounted to a side wall 41 of the support housing via a mounting plate 61.

Position-selecting lever 58 may be moved or pivoted from a first position, as shown in FIG. 10, to a second position, as shown in FIG. 11. In one embodiment of the sliding hitch assembly, the actuating assembly 28 and locking assembly 44 are configured so that when the position-selecting lever is in its first position, the locking assembly 44 is configured to secure the hitch carriage 12 and its associated fifth wheel hitch 24 in the first or driving position; and when the position-selecting lever is in its second position, the locking assembly 44 is configured to secure the hitch carriage 12 and its associated fifth wheel hitch 24 in its second or maneuvering position.

Actuating assembly 28 optionally further includes one or more biasing elements, in order to urge the position-selecting lever 58 toward one of the first and second lever positions. Alternatively or in addition, the actuating assembly 28 may include one or more locking elements so that the position-selecting lever 58 may be retained in one or both of the first and second lever positions. For example, actuating assembly 28 may include a lever lock 62 disposed adjacent the position-selecting lever 58, where the lever lock 62 may be configured to retain position-selecting lever 58 in a selected one of the first and second positions.

As depicted in FIGS. 9-11, lever lock 62 may include a peg 64 that is configured to engage one of a pair of notches or detents 66 in a lock retainer 67 in order to selectively retain the position-selecting lever 58 in the one of the first and second positions corresponding to the particular detent engaged by the peg 64. One or both detents 66 may include teeth or other friction means.

In order to unlock the position-selecting lever 58 to move it between the first and second positions, lever lock 62 must be pulled outwardly using finger pull 68 as suggested by the directional arrow in FIG. 10, thereby disengaging the peg 64 from one of the detents 66. In order to prevent the position-selecting lever 58 from becoming unintentionally unlocked, the lever lock 62 may be biased towards its locking position, such as by a tension spring 70, or an analogous biasing element.

The lever lock 62 may include any of a variety of alternative constructions. For example, rather than having a pull handle that must be pulled outwardly and/or upwardly, the lever lock may include a pull handle having a vertical finger pull mechanism Additional security may be provided by incorporating a physical lock device to mechanically prevent lever lock 62 from being pulled outwardly, in order to avoid the possibility of the hitch carriage becoming unintentionally unlocked with respect to movement upon the slide rails during use. In one aspect of the sliding hitch assembly, the lock mechanism includes a retaining means 72. As shown in FIG. 9, retaining means 72 may be in the form of a locking pin, where the locking pin includes both a pin 74 and a cotter 76. The locking pin may be configured so that unless cotter 76 is disengaged and pin 74 withdrawn from lever lock 62, the lever lock is physically prevented from being pulled outwardly.

An actuating linkage 78 may be attached to the position-selecting lever 58 as shown in FIGS. 9-11. The actuating linkage 78 may be routed through a support housing 20 and operably connected to a curved plate 80 such that by moving the position-selecting lever 58 from the first position toward the second position a tensile load is applied to the actuating linkage 78 (i.e., lever 58 pulls on the actuating linkage 78), thereby actuating the locking assembly 44.

Figure 12:
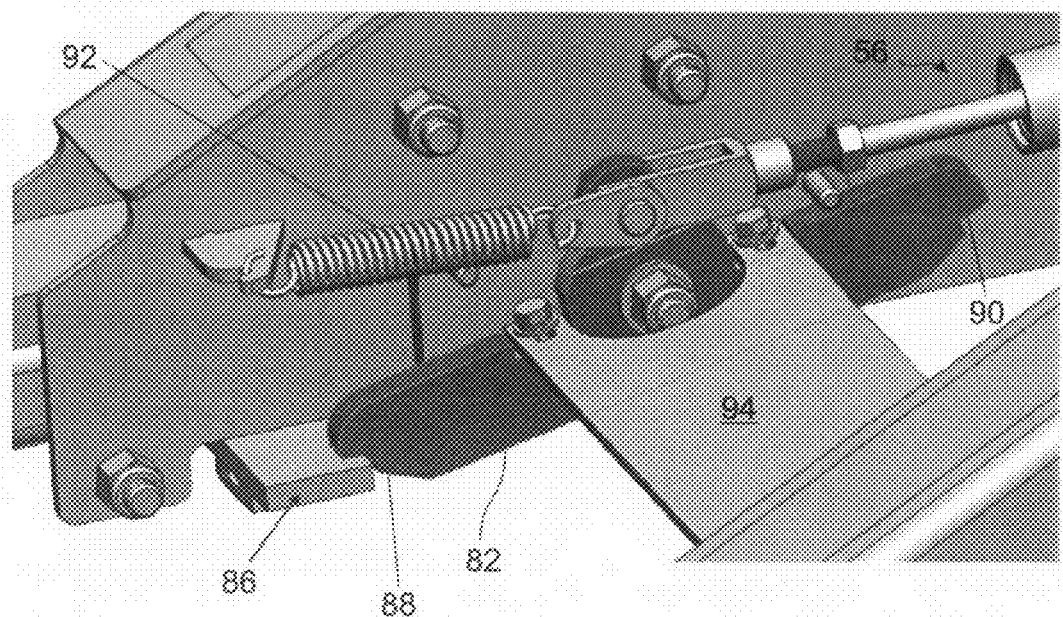
FIG. 12 is a perspective view of a detail of the locking assembly of the sliding hitch assembly of FIG. 1, with the locking assembly locked in an appropriate position for locking the sliding hitch assembly of FIG. 1 in a towing configuration.
Figure 13:
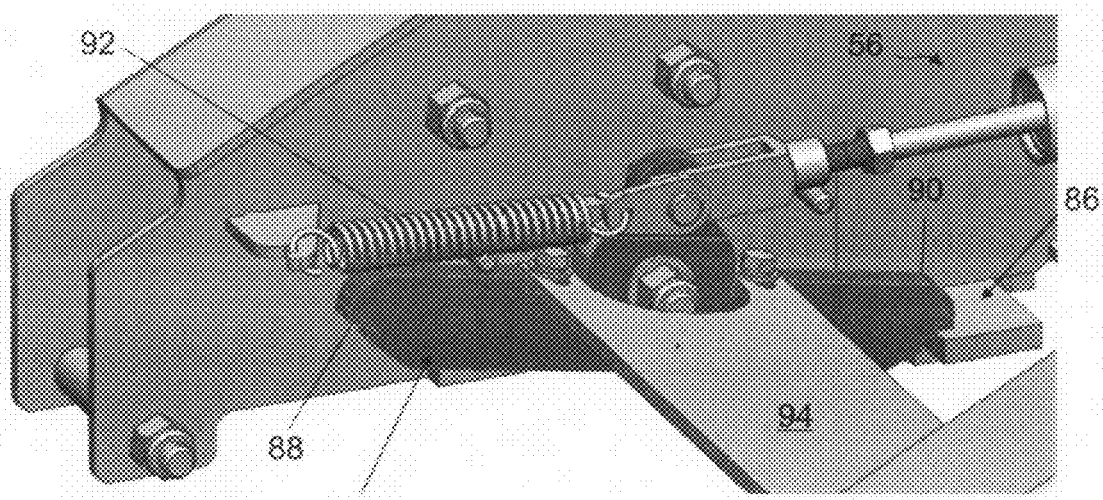
FIG. 13 is a perspective view of a detail of the locking assembly of the sliding hitch assembly of FIG. 1, with the locking assembly locked in an appropriate position for locking the sliding hitch assembly of FIG. 1 in a maneuvering configuration.

Locking assembly 44 may include first and second pivot plates 82, 84, as shown in FIGS. 12 and 13, and alternatively referred to as flipper plates and/or flippers. Each of first and second pivot plates 82, 84 may be pivotally attached to the side of a support housing 20. Typically, each support housing of the support assembly includes a pivot plate. Where the hitch carriage of the sliding hitch assembly includes two support housings 20, as shown for the embodiment of FIGS. 1 and 2, the pivot plates 82, 84 may be disposed on a side wall 41 of the support housing, and may be disposed on adjacent support housings in a mirror-symmetric fashion.

Pivot plates 82, 84 may be configured to pivot between a first position and a second position. In FIG. 12, pivot plate 82 is shown in the first pivot plate position, where first end 88 of the pivot plate is lower than the second end 90 of the pivot plate, and first end 88 abuts pivot stop 86. The first end 88 of pivot plate 82 may be configured to engage to a greater or lesser degree with pivot stop 86, for example by incorporating a notch or detent shaped to at least significantly match the profile of pivot stop 86. In the example of FIG. 12, first end 88 of pivot plate 82 incorporates a right-angle notch configured to match the upper and forward-facing corner of pivot stop 86. The second end 90 of pivot plate 82 may be similarly shaped to engage the opposite (upward and rearward-facing) corner of pivot stop 86. The locking assembly 44 may incorporate one or more biasing elements, such as pivot bias spring 92, to bias pivot plate 82, 84 toward the first pivot plate position.

First and second pivot plates may be moved between the first and second pivot plate positions by moving the position selecting lever 58 of actuating assembly 28, via a coupling between curved plate 80 and anti-binding assembly 56, which is in turn coupled to pivot plates 82 and 84. In the embodiment of FIGS. 12 and 13, the anti-binding assembly 56 is coupled to pivot plate 82 via a clevis fastener, but any of a variety of couplings may be used as alternatives.

The first and second pivot plate positions may be related to the first and second positions of hitch carriage 12 as follows. Translating hitch carriage 12 forward (i.e. toward the towing vehicle) on the rail assembly 14 results in travel plate 42 of support housing 20 contacting forward plate stop 36. The hitch carriage may be locked in this first towing position when position-selecting lever 58 is in its upper and inward-most position, insuring that the first and second pivot plates are in their first pivot plate position (as shown in FIG. 12). In this configuration, each travel plate 42 of each support housing 20 remains substantially in contact with forward plate stop 36, and the first end 88 of each pivot plate 82, 84 abuts and engages with pivot stop 86. In this configuration, towing force may be transferred from the rail assembly 14 (which is mounted to the towing vehicle) to pivot plates 82, 84 via pivot stops 86. In this way, the towing force is transferred to the hitch carriage and thereby to the towed load.

The towing vehicle operator may prepare the sliding hitch assembly for shifting the hitch carriage to the second, maneuvering position by pulling position-selecting lever 58 outward and downward and locking the lever in that position. In doing so, pivot plates 82, 84 are moved to the second pivot plate position, where the second end 90 of each pivot plate is lower than the first end 88 of the pivot plate. Pivot stop 86 therefore no longer prevents hitch carriage 12 from moving rearward on the rail assembly, and the operator can shift the hitch carriage rearward. As the hitch carriage moves toward the towed load, pivot plates 82, 84 pass over pivot stop 86. Although the second end 90 of each pivot plate is in its lowered position, the pivot plate retains sufficient pivotal freedom that the pivot stop can displace the second end 90 upward and pass beneath the pivot plate, at which point the bias being applied to the pivot plate returns it to the second pivot plate position, as shown in FIG. 13.

In the resulting configuration of the locking assembly 44, the second end 90 of pivot plates 82, 84 abut and are engaged with pivot stops 86, and travel plate 42 is in contact with aft stop plate 34. This engagement prevents any forward movement of the hitch carriage 12, and transfers towing force from rail assembly 14 to the hitch carriage via aft stop plates 34 and travel plate 42. The rearward displacement of the hitch carriage to this second position results in greater maneuverability of the towed load for the towing vehicle operator.

When it is desirable to return the hitch carriage 12 to its first, towing position, position-selecting lever 58 may be moved upward and inward and locked in position, thereby moving pivot plates 82 and 84 back to the first pivot plate position, so that the first end 88 of each pivot plate is lower than the second end of the pivot plate. As pivot stop 86 no longer prevents hitch carriage 12 from moving forward on the rail assembly, the hitch carriage can be translated forward (toward the towing vehicle), with pivot stop 86 sliding beneath second end 90 of pivot plates 82 and 84, and then displacing first end 88 upward against the bias applied to the pivot plates, which then snap back into their first position, as shown in FIG. 12, locking the hitch carriage again in its first position.

Movement of first and second pivot plates 82, 84 may be individually actuated by the movement of position-selecting lever 58, as described above. Additionally and/or alternatively, the position-selecting lever 58 may be operably connected to the first pivot plate 82, which is in turn operably connected to the second pivot plate 84, for example by way of a connecting member 94. When first and second pivot plates 82 and 84 are coupled by a connecting member 94, the connecting member typically spans the distance between the first and second pivot plates 82 and 84. Connecting member 94 may include a plate, rod or tube and may be configured such that effecting the pivotal movement of first pivot plate 82 results in the second pivot plate 84 substantially mirroring the effected movement. Locking assembly 44 is typically operably connected to the position-selecting lever 58 via an anti-binding assembly 56. More particularly, position-selecting lever 58 is typically operably connected to pivot plate 82 via the anti-binding assembly 56.

During normal operation pivot plates 82, 84 may become bound, or physically restrained from pivoting freely by virtue of forces being applied to the pivot plates via pivot stop 86. Typically, pivot plates 82, 84 may become bound due to the application of uncompensated forces to the pivot plates, for example due to tensions existing between the towing vehicle and the towed load.

If locking assembly 44 were operably coupled to the actuating assembly 28 by a rigid and noncompressible linkage, when binding forces prevented pivot plates 82, 84 from freely pivoting, position-selecting lever 58 would be necessarily similarly frozen in position. The operator of the towing would therefore be unable to unlock the hitch carriage, and would therefore be prevented from shifting the hitch carriage to its alternate position. When a locking mechanism or hitch carriage is bound in this way, it may require incremental maneuvering of the towing vehicle, interrupted by frequent attempts to shift position-selecting lever 58, until the locking mechanism is finally unbound.

By employing an anti-binding assembly as disclosed herein to couple the actuating assembly 28 to the pivot plates of the locking assembly, the position of position-selecting lever 58 may be changed even when binding forces may prevent pivot plates 82, 84 from pivoting, and the orientation of the pivot plates 82, 84 will nonetheless change automatically once the forces binding the pivot plates are resolved.

Figure 14:
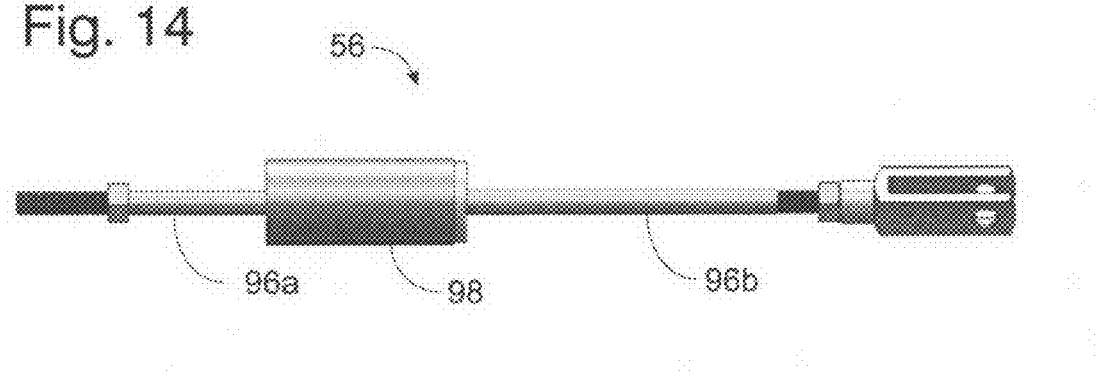
FIG. 14 is a side view of an anti-binding assembly of the sliding hitch assembly of FIG. 1.
Figure 15:
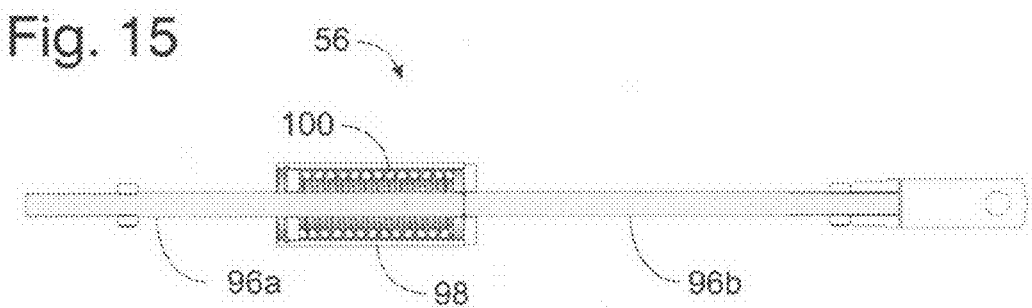
FIG. 15, is a side sectional view of the anti-binding assembly of FIG. 14.

In one embodiment of the invention, the sliding hitch assembly 10 includes an anti-binding assembly 56, as shown in FIGS. 14 and 15. Anti-binding assembly 56 typically couples the curved plate 80 of actuating assembly 28 to first pivot plate 82 via rod 96, where rod 96 may include a first rod section 96a connected to the curved plate 80 and a second rod section 96b connected to the first pivot plate 82. Rod sections 96a and 96b may be coupled to one another via a compression cylinder 98 that includes a spring 100. Typically the compression cylinder 98 is disposed around rod 96, between rod sections 96a and 96b.

When hitch carriage 12 is disposed in the first position (or towing position) along rail assembly 14, position-selecting lever 58 is in its corresponding upward orientation, and anti-binding assembly 56 is urging the first ends 88 of pivot plates 82, 84 downward, maintaining contact between the first ends 88 and pivot stops 86.

If it becomes desirable to translate the hitch carriage to the second position (or maneuvering position), position-selecting lever 58 may be pulled outwardly and downwardly, applying tension to actuating linkage 78. When pivot plates 82 and 84 are not bound, anti-binding assembly 56 will pivot the plates so that the first ends 88 are raised and second ends 90 are lowered. However, if pivot plates 82 and 84 are bound by applied forces and will not readily pivot, position-selecting lever 58 may still be pulled outwardly and downwardly, and as a result will apply a constant tensile force to spring 100 of the anti-binding assembly, stretching it lengthwise. Because this tension is being applied constantly, when and if the forces binding the pivot plates in position are removed and/or resolved, the pivot plates will automatically pivot to the desired second position, and hitch carriage 12 may then be shifted to the second maneuvering position. Once the position-selecting lever is shifted, if the pivot plates are freed they will automatically pivot into the desired position, while the towing vehicle operator remains safely inside the towing vehicle.

Similarly, when hitch carriage 12 is disposed in the second position (or maneuvering position) along rail assembly 14, position-selecting lever 58 is in its downward and outward orientation, and anti-binding assembly 56 is applying tension to pivot plates 82, 84, urging the second ends 90 of the pivot plates 82, 84 downward so that contact is maintained between second ends 90 and pivot stop 86. To translate the hitch carriage to its first, or towing position, position-selecting lever 58 is pulled upwardly and inwardly, thereby pushing on actuating linkage 78. When pivot plates 82 and 84 are not bound, anti-binding assembly 56 will pivot the plates so that the second ends 90 are raised and first ends 88 are lowered. However, if hitch carriage 12 and therefore pivot plates 82 and 84 are bound by applied forces, by moving position-selecting lever 58 inwardly and upwardly a compressive force will be applied to spring 100, compressing the spring and thereby applying constant pressure to pivot plates 82, 84 so that once the forces binding the pivot plates are removed, the pivot plates will automatically pivot to the desired position and the hitch carriage 12 may be shifted to the first towing position while the operator remains safely inside the towing vehicle.

Operating Instructions

From the perspective of the towing vehicle operator, the exemplified sliding hitch assembly 10 may greatly simplify the process of shifting a fifth wheel hitch into position for enhanced maneuvering, as exemplified by the following operating procedure:

1. Align trailer and tow vehicle in a straight line on a level surface;

2. Pull up on lever lock 62 and out on pull handle 60 of position-selecting lever 58, then release lock lever 62;
3. When the position-selecting lever 58 is put into the maneuver position, make note whether the pivot plates 82, 84 rotated or not. If pivot plates 82, 84 rotated appropriately, then proceed to step 5;
4. If pivot plates 82, 84 did not rotate, then set the trailer brakes and back the tow vehicle up slightly until you hear the pivot plates 82, 84 actuate. Then proceed to step 5;
5. Set the trailer brakes and slowly pull the tow vehicle forward until the hitch carriage 12 stops moving and you hear the pivot plates 82, 84 engage with pivot stop 86.

The process of shifting a fifth wheel hitch back to the appropriate position for towing is similarly simplified by the exemplified sliding hitch assembly, as exemplified by the following operating procedure:
1. Align trailer and tow vehicle in a straight line on a level surface;
2. Pull up on lever lock 62 and push in on pull handle 60 of position-selecting lever 58, then release lock lever 62;
3. When the position-selecting lever 58 is put into the driving position, make note whether the pivot plates 82, 84 rotated or not. If pivot plates 82, 84 rotated appropriately, then proceed to step 5;
4. If pivot plates 82, 84 did not rotate then set the set the trailer brakes and pull the tow vehicle forward slightly until you hear the pivot plates 82, 84 actuate. Then proceed to step 5;
5. Set the trailer brakes and slowly move the tow vehicle rearward until the hitch carriage 10 stops moving and you hear the pivot plates 82, 84 engage.

It should be appreciated that although selected embodiments of the representative hitch assemblies are disclosed herein, numerous variations of these embodiments may be envisioned by one of ordinary skill that do not deviate from the scope of the present disclosure. The presently disclosed sliding hitch assemblies are well suited to a variety of both private and commercial towing applications, including conventional truck and semi-trailer operation.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated. Novel and non-obvious combinations and subcombinations of features, functions, elements and/or properties disclosed herein may be claimed through presentation of claims in a related application.

The invention claimed is:

1. A sliding hitch assembly, comprising:
a rail assembly;
a support assembly disposed upon and configured to translate between at least two positions along the rail assembly;
a hitch head assembly mounted on the support assembly; and
a translation lock mechanism that includes a locking assembly coupled to the support assembly and configured to selectively lock the support assembly in one or more of the at least two positions on the rail assembly, and an actuating assembly configured to actuate the locking assembly, where the actuating assembly includes a position-selecting lever, and is operably coupled to the locking assembly by an anti-binding assembly;
where the anti-binding assembly includes a first rod section coupled to the position-selecting lever, and a second rod section coupled to the locking assembly, where the first and second rod sections are coupled to each other via a compression cylinder, such that the anti-binding assembly is configured to permit the operation of the actuating assembly when the locking assembly is bound, and actuate the locking assembly when the locking assembly is no longer bound.

2. The sliding hitch assembly of claim 1, where the compression cylinder is configured to apply either of a compressive force or a tensile force to the locking assembly.

3. The sliding hitch assembly of claim 2, where the compression cylinder includes a spring coupled to both the first rod section and the second rod section.

4. The sliding hitch assembly of claim 1, wherein the support assembly is disposed upon the rail assembly via a glide block that includes a composite material.

5. The sliding hitch assembly of claim 1, wherein an upper sliding surface of the rail assembly includes a composite material, and the support assembly is disposed upon the upper sliding surface via a glide block that includes a composite material.

6. A sliding hitch assembly, comprising:
a rail assembly having an upper sliding surface;
a support assembly disposed upon the upper sliding surface via a glide block that includes a composite material, where the support assembly is configured to translate between at least two positions along the rail assembly on the composite glide block;
a hitch head assembly mounted on the support assembly; and
a translation lock mechanism that includes a locking assembly coupled to the support assembly and configured to selectively lock the support assembly in one or more of the at least two positions on the rail assembly, and an actuating assembly configured to actuate the locking assembly, where the actuating assembly includes a position-selecting lever, and is operably coupled to the locking assembly by an anti-binding assembly;
where the anti-binding assembly includes a first rod section coupled to the position-selecting lever, and a second rod section coupled to the locking assembly, where the first and second rod sections are coupled to each other via a compression cylinder, such that the anti-binding assembly is configured to permit the operation of the actuating assembly when the locking assembly is bound, and actuate the locking assembly when the locking assembly is no longer bound.

7. The sliding hitch assembly of claim 6, where the actuating assembly is operably coupled to the locking assembly by an anti-binding assembly that is configured to permit the operation of the actuating assembly when the locking assembly is bound, and actuate the locking assembly when the locking assembly is no longer bound.

8. The sliding hitch assembly of claim 6, wherein the rail assembly has an upper sliding surface that is a metal surface.

9. The sliding hitch assembly of claim 6, wherein the composite material includes a ultra-high-density polyethylene polymer, an ultra-high-molecular-weight polyethylene polymer, or a nylon polymer.

10. A sliding hitch assembly, comprising:
a rail assembly including a slide rail and a pivot stop, where the slide rail includes an upper sliding surface and the pivot stop is disposed adjacent to the slide rail;
a support assembly, where the support assembly is disposed upon the upper surface of the slide rail via a composite glide block and configured to translate along the slide rail between a first and a second position;
a hitch head assembly pivotally mounted on the support assembly;
a locking assembly coupled to the support assembly including a pivot plate pivotally attached to the support assembly, the pivot plate having a first end and a second end, where the pivot plate first end is configured to engage the pivot stop to retain the support assembly in the first position when the pivot plate is in a first orientation, and the pivot plate second end is configured to engage the pivot stop to retain the support assembly in the second position when the pivot plate is in a second orientation; and
an actuating assembly operably coupled to the pivot plate via an anti-binding assembly, where the actuating assembly is configured to reversibly pivot the pivot plate between the first and second orientations through the selective application of an appropriate bias to the pivot plate;
where the anti-binding assembly is configured to apply the appropriate bias to the pivot plate when it is bound, and the applied bias is sufficient to pivot the pivot plate when it is subsequently not bound.

11. The sliding hitch assembly of claim 10, where the anti-binding assembly includes a spring member, and the appropriate bias is one of a tensile force or a compressive force.

12. The sliding hitch assembly of claim 10, where the support assembly includes a support housing disposed upon the upper surface of the slide rail.

13. The sliding hitch assembly of claim 12, where the support assembly includes a cross member secured to the support housing, where the hitch head assembly is pivotally coupled to the cross member.

14. The sliding hitch assembly of claim 12, where the support housing includes a travel plate, and the rail assembly includes a forward plate stop and an aft plate stop disposed in the translational path of the travel plate, such that when the travel plate is in contact with the forward plate stop, the support assembly is in the first position, and when the travel plate is in contact with the aft plate stop, the support assembly is in the second position.

15. The sliding hitch assembly of claim 10, where the hitch head assembly includes a fifth wheel hitch, the first position is a towing position, and the second position is a maneuvering position.

16. The sliding hitch assembly of claim 15, where the fifth wheel hitch is configured to be disposed substantially above a rear axle of a towing vehicle in the first position, and disposed toward the rear of the towing vehicle in the second position.

17. The sliding hitch assembly of claim 10, wherein the rail assembly includes two slide rails, and two base rails, where the base rails are configured to be secured to a mounting surface of a towing vehicle, and the slide rails are configured to be secured to the base rails.

18. The sliding hitch assembly of claim 10, where the actuating assembly includes a position-selecting lever and a lever lock;
where a first position of the position-selecting lever corresponds to the first orientation of the pivot plate, and a second position of the position-selecting lever corresponds to the second orientation of the pivot plate; and
the lever lock is disposed adjacent the position-selecting lever and configured to retain the position-selecting lever in a selected one of the first and second positions.

19. The sliding hitch assembly of claim 18, where the lever lock includes a peg configured to engage an appropriate detent in a lock retainer to selective retain the position-selecting lever in the first or second position; and the lever lock is biased toward its locking position by a biasing element.

* * * * *